Patented July 5, 1932

1,865,869

UNITED STATES PATENT OFFICE

WALTER LUYKEN, OF DUSSELDORF, GERMANY, ASSIGNOR TO KAISER WILHELM INSTITUT FÜR EISENFORSCHUNG, OF DUSSELDORF, GERMANY

PROCESS FOR THE MAGNETIC TREATMENT OF IRON ORES

No Drawing. Application filed October 8, 1931, Serial No. 567,751, and in Germany August 10, 1928.

It is known that mineral iron of feebly magnetic red and brown iron ores, in which the iron is present in the highest stage of oxidation, can be converted into the ferromagnetic form by reduction to lower stages of oxidation, whereby the subsequent electromagnetic concentration is facilitated. The desired stage of oxidation according to this method of operation is $Fe_3O_4$. It is not possible however to avoid all possible stages of oxidation being passed until metal is reached in the course of the reduction and as the capacity of these various substances for magnetization varies greatly, the subsequent magnetic separation yields a substance that has an unsatisfactory composition.

It has been found by research that, in addition to the ferro-magnetic $Fe_3O_4$, a ferromagnetic form of $Fe_2O_3$ is also possible, the permeability of which is even higher than that of $Fe_3O_4$. According to the invention the ferro-magnetic $Fe_2O_3$ is made usable for the practical concentration of iron ores by conducting the reducing operation in such manner that the formation of the ferro-magnetic $Fe_2O_3$ can take place in the ores. My experiments with various iron ores have shown that the ferro-magnetic $Fe_2O_3$ can be produced by re-oxidizing the ores in which the iron is present in the highest stage of oxidation, as, for example, in red and brown iron ores, after they have been subjected to the well known process of reduction at temperatures of from 400° to 700° C. and maintaining temperatures of from 220° to 500° C., during this oxidation. It has also been found that the prejudicial effect to the magnetic preparation due to over-reduction, such as frequently occurs during the reducing treatement by producing free protoxide, is effectually overcome and nullified by such reoxidation treatment.

Thus, according to the invention, the highest stage of oxidation in the ores is brought back from the lower stages of oxidation reached after the well known reducing operation, by re-oxidation, a suitable range of temperatures being maintained.

The following example will serve to explain the process and also demonstrate the practical advantages obtained:—

A German red iron ore was taken and treated as follows:—

1. Direct magnetic separation of the unroasted ore.
2. Reduction of the ore to low stages of oxidation with subsequent magnetic separation of the roasted material.
3. Reduction of the ore to low stages of oxidation, then oxidation of the roasted material for the purpose of restoring the highest stage of oxidation, and finally magnetic separation.

Below is given the degree of separation which is generally accepted at the present time as the measure of the concentration factor in order to characterize the result of the concentration.

The degree of separation for the electromagnetic separation of the unroasted sample of ore was 26.2% and the exciting current of the magnetic separator was 8 amps. at 220 volts.

For a sample of the same ore which had been subjected to reduction at 500° C. with illuminating gas for one hour, and electromagnetically separated on the same separator, the degree of separation for the pure magnetic separation was 25.9% and for the total concentration, which includes the concentration effected by the roasting 39.8%. It was found possible to reduce the exciting current to 0.24 amps.

For a sample of the same ore which was subjected to a reduction and afterwards oxidized in a current of air at a temperature between 500° and 300° C., the extent of electro-magnetic separation rose on the subsequent concentration of this reduced product to 38.8%, while in conjunction with the concentration produced by the expulsion of water of crystallization, carbonic acid, and the like, during the reduction, it rose to a total of 50.2%. In this case it was possible to reduce the excitation of the separator to 0.19 amps.

Thus among the advantages of the process are that by it the concentration output or factor is increased, it is possible to use cheaper magnetic separators with weak magnetic fields, and there is a saving in the exciting current.

The process can also be used when mixtures of ferro-magnetic mineral iron occurs with red or brown ironstone.

I claim:

The process of treating red and brown iron ores by the magnetic method for the purpose set forth, which consists in subjecting the ore to a reducing treatment in the presence of sufficient carbonaceous material and for a sufficient period to transform the iron compounds of the ore into ferro-magnetic $Fe_3O_4$, then subjecting the ore to reoxidation in the presence of a gaseous oxidizing agent at temperatures maintained substantially within the range of from 220° to 500° C. for a sufficient period of time to convert the reduced ore of lower oxidation stage to ferro-magnetic $Fe_2O_3$, and then subjecting the treated ore to magnetic separation.

WALTER LUYKEN.